US012590789B2

(12) United States Patent
Crawford

(10) Patent No.: US 12,590,789 B2
(45) Date of Patent: Mar. 31, 2026

(54) FISH MEASURING BOARD

(71) Applicant: Castek LLC, Salem, UT (US)

(72) Inventor: Ryan Crawford, Salem, UT (US)

(73) Assignee: Castek LLC, Salem, UT (US)

( * ) Notice: Subject to any disclaimer, the term of this patent is extended or adjusted under 35 U.S.C. 154(b) by 389 days.

(21) Appl. No.: 18/329,300

(22) Filed: Jun. 5, 2023

(65) Prior Publication Data

US 2023/0400290 A1 Dec. 14, 2023

Related U.S. Application Data

(60) Provisional application No. 63/351,679, filed on Jun. 13, 2022.

(51) Int. Cl.
G01B 3/04 (2006.01)
A01K 99/00 (2006.01)

(52) U.S. Cl.
CPC ............... G01B 3/04 (2013.01); A01K 99/00 (2013.01)

(58) Field of Classification Search
CPC .................................. G01B 3/04; A01K 99/00
USPC ........................... 33/483, 484, 485, 493, 511
See application file for complete search history.

(56) References Cited

U.S. PATENT DOCUMENTS

| | | | | |
|---|---|---|---|---|
| 3,259,988 A * | 7/1966 | Lunn | ...................... | A01K 97/00 |
| | | | | D10/70 |
| 5,097,617 A * | 3/1992 | Craven | .................. | A01K 97/00 |
| | | | | 33/511 |
| 5,228,226 A * | 7/1993 | Porosky | ................. | A01K 97/14 |
| | | | | 33/485 |
| 5,339,532 A * | 8/1994 | O'Keefe | ............... | A01K 61/90 |
| | | | | D10/70 |
| 5,526,575 A * | 6/1996 | Hoover | .................... | G01B 3/02 |
| | | | | 33/549 |
| 5,637,838 A * | 6/1997 | Arey | ........................ | G01B 3/08 |
| | | | | 177/4 |
| 6,115,932 A * | 9/2000 | Fedora | ................. | G01B 3/1003 |
| | | | | 33/511 |
| 6,415,521 B1 * | 7/2002 | Schnell | .................. | A01K 97/00 |
| | | | | 33/549 |
| 6,765,155 B1 * | 7/2004 | Gray | ...................... | G01G 19/60 |
| | | | | 33/549 |
| 6,901,674 B2 * | 6/2005 | Pieczynski | ............. | G01B 3/004 |
| | | | | 33/549 |
| 6,959,499 B2 * | 11/2005 | Bini | ........................ | A01K 97/00 |
| | | | | 33/511 |
| 7,055,257 B2 * | 6/2006 | Pieczynski | ............. | G01B 3/004 |
| | | | | 33/511 |
| 7,191,536 B1 * | 3/2007 | Bailey | .................... | A01K 61/90 |
| | | | | 33/549 |
| 7,605,332 B2 * | 10/2009 | Winkler | ................. | A01K 97/08 |
| | | | | 340/573.2 |
| 7,665,220 B1 * | 2/2010 | Gee | .......................... | G01B 3/10 |
| | | | | 33/511 |

(Continued)

*Primary Examiner* — George B Bennett

(74) *Attorney, Agent, or Firm* — Thorpe North & Western, LLP

(57) ABSTRACT

A fish measuring board has an elongated board with an upper surface with a trough to receive a fish. A stopper at one end of the board closes the trough and abuts to the fish. A scale is carried by the board and extends from the stopper to measure a length of the fish. A hollow in the board is substantially sealed and provides buoyancy to the board. A track in the bottom of the board can receive and attach an accessory.

18 Claims, 10 Drawing Sheets

(56)      References Cited

U.S. PATENT DOCUMENTS

|  |  |  |  |  |
|---|---|---|---|---|
| 8,141,262 | B1 * | 3/2012 | Lee | A01K 97/00 |
|  |  |  |  | 33/549 |
| 9,046,341 | B2 * | 6/2015 | Orman | A01K 97/00 |
| 10,463,032 | B2 * | 11/2019 | Cordell | A01K 97/00 |
| 11,357,222 | B2 * | 6/2022 | Weskamp | G01B 3/06 |
| 11,733,017 | B2 * | 8/2023 | Weskamp | G01B 3/08 |
|  |  |  |  | 33/511 |
| 2004/0163267 | A1 * | 8/2004 | Bini | A01K 97/00 |
|  |  |  |  | 33/511 |
| 2007/0209219 | A1 * | 9/2007 | Ertmer | A01K 97/00 |
|  |  |  |  | 33/511 |
| 2011/0192046 | A1 | 8/2011 | Kinziger |  |
| 2012/0324751 | A1 * | 12/2012 | Wakeman | A01K 97/00 |
|  |  |  |  | 33/759 |
| 2014/0259713 | A1 * | 9/2014 | Nichols | G01B 3/08 |
|  |  |  |  | 33/427 |
| 2016/0278357 | A1 * | 9/2016 | Ostfeld | G01B 3/1004 |
| 2017/0000099 | A1 * | 1/2017 | Wanke | A01K 97/00 |
| 2019/0045768 | A1 * | 2/2019 | Rasmussen | G01G 19/60 |
| 2020/0288689 | A1 | 9/2020 | Weskamp et al. |  |
| 2022/0082366 | A1 | 3/2022 | Weskamp et al. |  |
| 2022/0333908 | A1 * | 10/2022 | Bryan | A01K 97/00 |

* cited by examiner 162
184
138
168
196
192
176
180
10

FISH MEASURING BOARD

PRIORITY CLAIM

Priority is claimed to U.S. Provisional Patent Application Ser. No. 63/351,679, filed Jun. 13, 2022, which hereby incorporated herein by reference.

BACKGROUND

In kayak fishing tournaments, a fish measuring board is utilized to measure and verify catches. A measuring board is carried with each kayaker. The measuring board has an area to receive a fish and a corresponding length scale. When a participant catches a fish, the fish is placed on the measuring board and a picture is taken of the fish. The picture captures a length of the fish along with a tag or identifier of the participant. Some measuring boards have been prohibited as being too flexible, and thus inaccurate, because inadvertent or deliberate bowing of the board can cause a longer measurement. The development of fish measuring boards is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
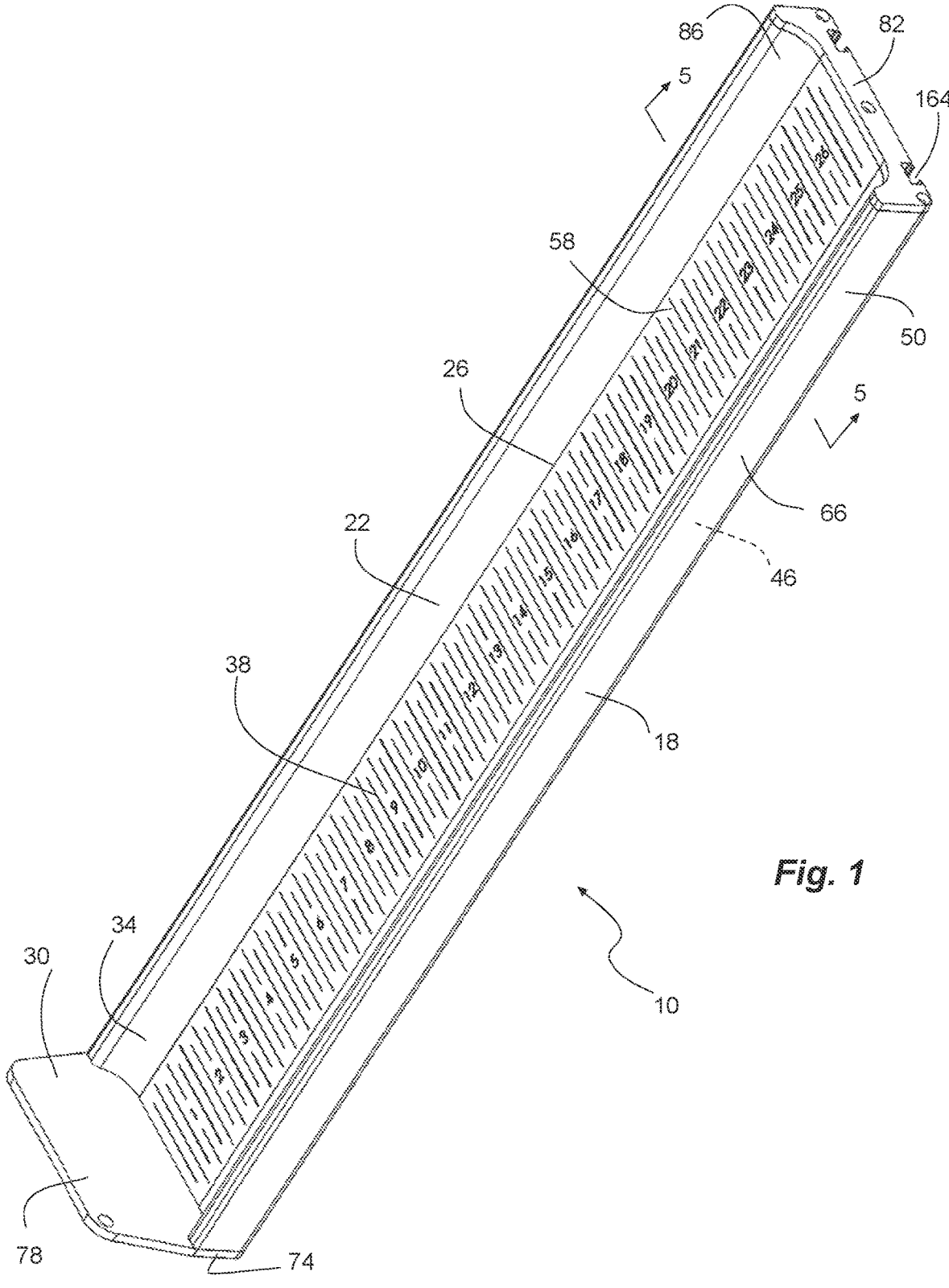
FIG. 1 is a perspective view of a fish measuring board in accordance with one embodiment.
Figure 2:
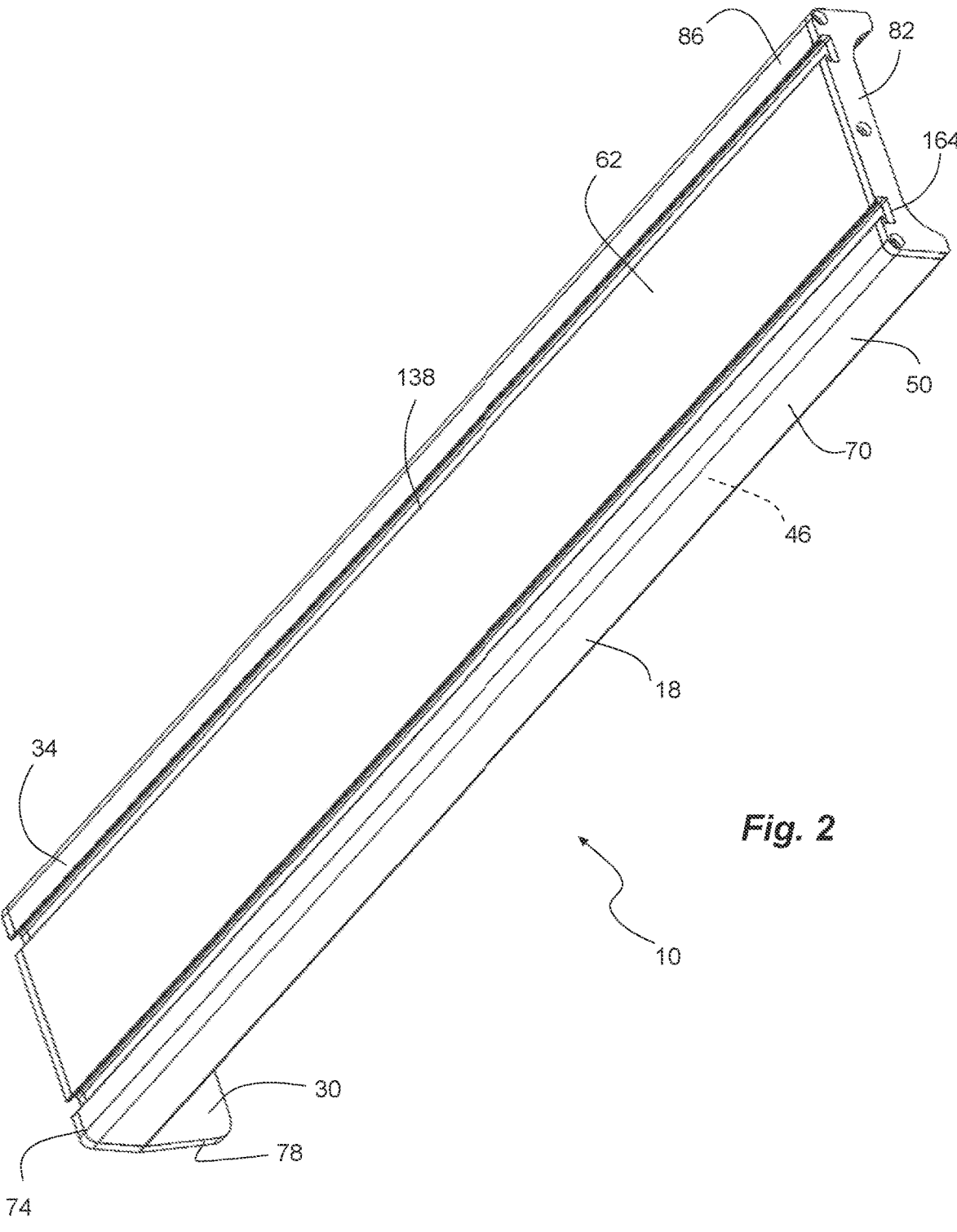
FIG. 2 is a bottom perspective view of the fish measuring board of FIG. 1.
Figure 3:
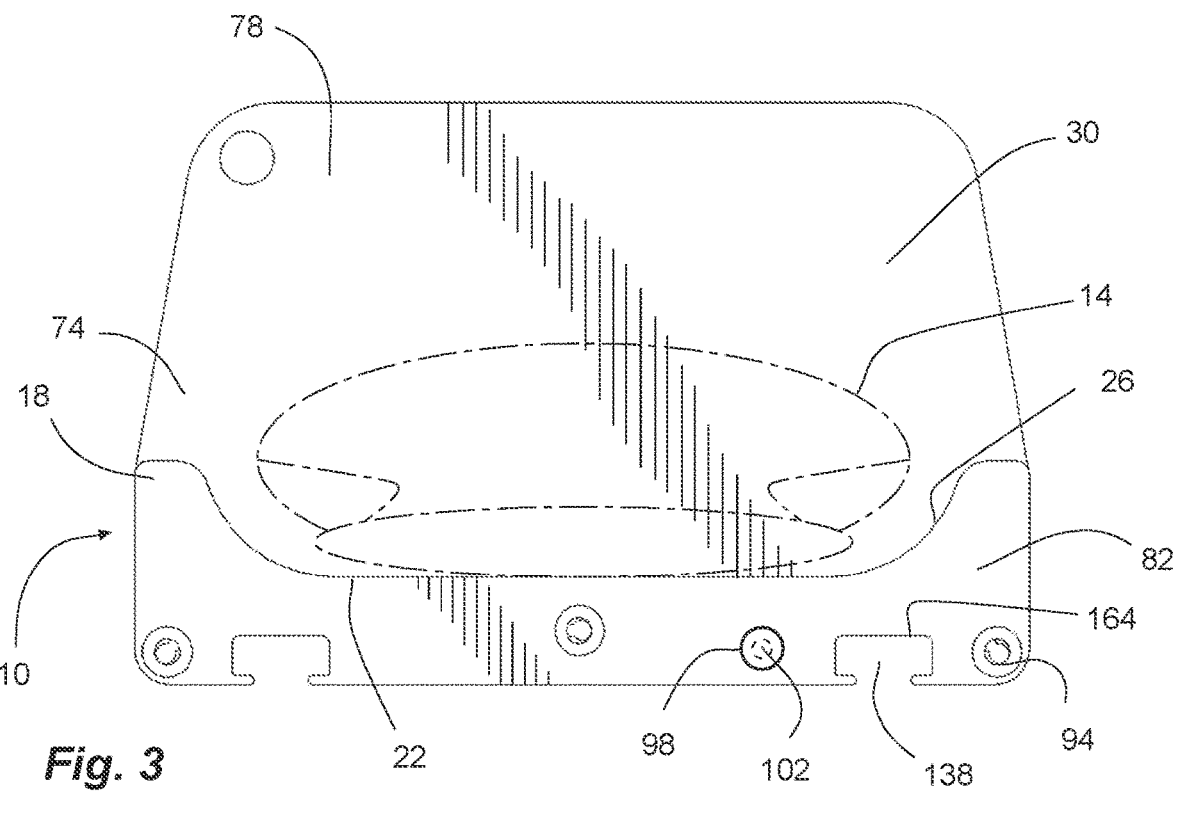
FIG. 3 is a bottom end view of the fish measuring board of FIG. 1.
Figure 4:
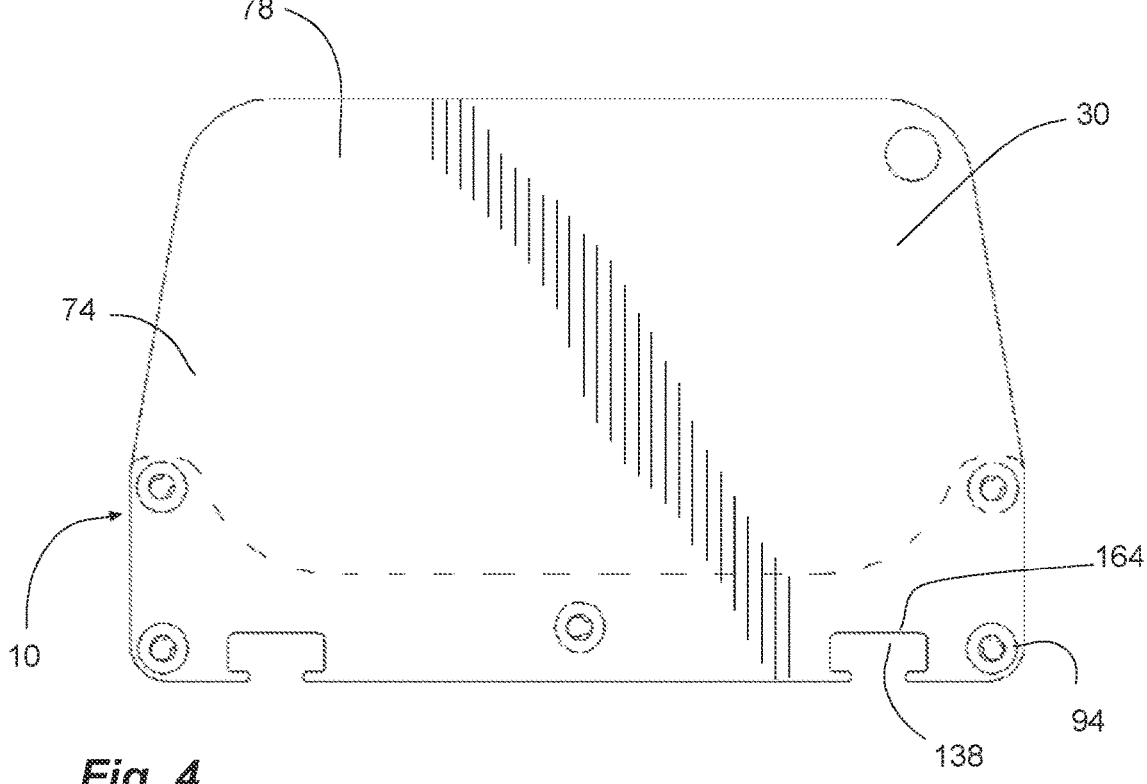
FIG. 4 is a top end view of the fish measuring board of FIG. 1.
Figure 5:
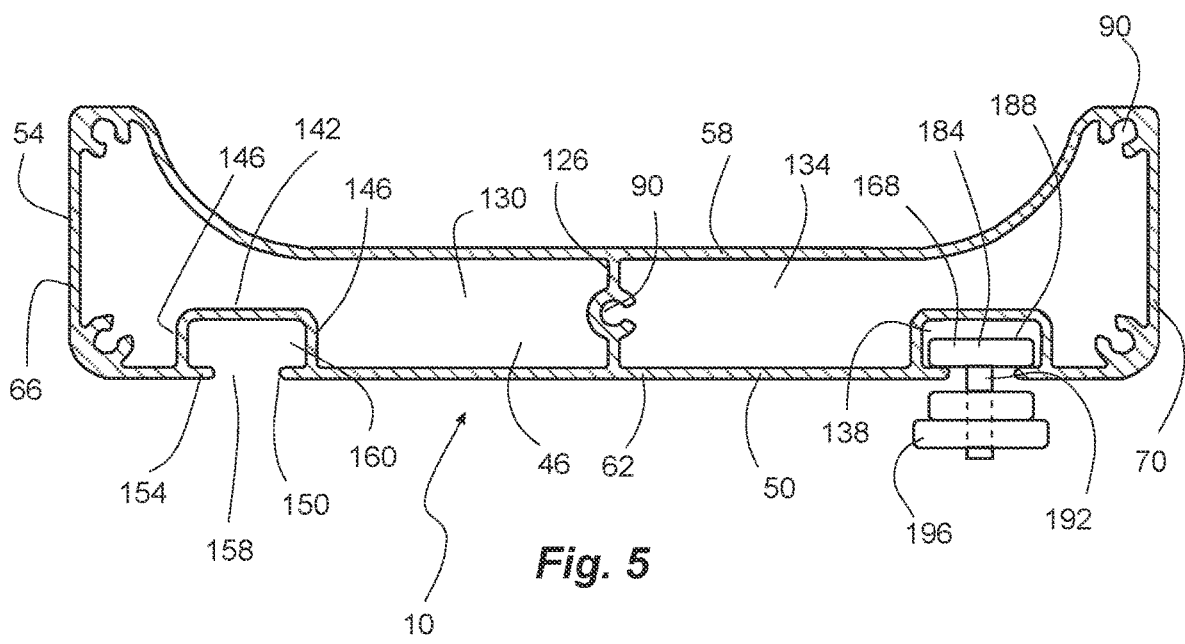
FIG. 5 is a cross-sectional view of the fish measuring board of FIG. 1, taken along line 5 of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The invention provides a fish measuring board that can be carried with a fisherman and/or competitor while fishing and during a competition to measure a fish and document the measurement. In one aspect, the board can be buoyant to resist inadvertent sinking and loss. In another aspect, the board can have an attachment track for accessories.

Referring to FIGS. 1-6, a fish measuring board 10 in one example of the invention is shown for measuring a fish 14 and documenting the measurement. The fish measuring board 10 can have an elongated board 18 with an upper surface 22 formed as a trough 26 to receive the fish 14. The board 18, the upper surface 22 and the trough 26 can have a cross-sectional shape that is concave. The trough 26 can extend longitudinally the length of the board 18 to maintain the fish 14 on the board 18.

A stopper 30 can be positioned at one end, such as a proximal end 34, of the board 18 and the trough 26. In one aspect, the stopper 30 can close the trough 26 at the proximal end 34. Thus, a fish can be placed on the board 18 and in the trough 26 with the mouth of the fish 14 abutting to the stopper 30.

A scale 38 can be carried by the board 18 and the upper surface 22. The scale 38 can extend longitudinally from the stopper 30 in order to measure a length of the fish 14. With the fish 14 on the board 18 and in the trough 26, a picture can be taken of the fish 14 relative to the scale 38 and an associated identification or tag 42 (FIGS. 6 and 7) to document the length of the fish 14 and the identity of the associated fisherman or competitor. The identification or tag 42 can be a unique identifier associated with the fisherman or competitor. In one aspect, the scale 38 can be etched into the upper surface 22. In another aspect, the scale 38 can be printed on the upper surface 22.

In one aspect, the fish measuring board 10 can have a hollow 46 that is substantially sealed to provide buoyancy to the fish measuring board 10. Thus, if the fish measuring board 10 accidentally slips during handling or measurement, the fish measuring board 10 can float to avoid loss and facilitate retrieval.

In one aspect, the board 18, the upper surface 22, the trough 26 and the hollow 46 can comprise and can be formed by an elongated extrusion 50. The elongated extrusion 50 can have a cross-sectional profile with a continuous perimeter 54 completely circumscribing the hollow 46 and extending the length of the board 18. The profile of the extrusion 50 and the board 18 can be a tube with an elongated concave top 58; an elongated, substantially flat bottom 62; and opposite lateral sides 66 and 70 extending between the top and the bottom 58 and 62. The top 58 and the bottom 62 can be spaced-apart from one another to define the hollow 46. Similarly, the opposite lateral sides 66 and 70 can be spaced-apart from one another to define the hollow 46. The top 58, the bottom 62 and the opposite sides 66 and 70 can form the continuous perimeter 54. In one aspect, the extrusion 50 can be metal, such as aluminum. In another aspect, the extrusion 50 can be plastic. The extrusion 50, along with the continuous perimeter 54, can help maintain the rigidity of the board 18 and the integrity of the measurements.

In another aspect, a proximal end plate 74 can be attached to the proximal end 34 of the extrusion 50. In one aspect, the proximal end plate 74 can substantially close the open proximal end 34 of the extrusion 50. The proximal end plate 74 can have a tab 78 extending beyond the top 58 of the extrusion 50 and the upper surface 22 to form the stopper 30.

Similarly, a distal end plate 82 can be attached to a distal end 86 of the extrusion 50. In one aspect, the distal end plate 82 can substantially close the open distal end 86 of the extrusion 50. Thus, the hollow 46 can be formed by and defined by the extrusion 50 and the proximal and distal end plates 74 and 82. The hollow 46 can be elongated and can extend longitudinally the length of the board 18 and the extrusion 50. The distal end plate 82 can have a profile substantially matching the profile of the extrusion 50 so that the trough 26 is open on the distal end 86 to drain water from the trough 26. In one aspect, the proximal and distal end plates 74 and 82 can abut to the ends 34 and 86 of the extrusion 50 to substantially seal the extrusion 50 and the hollow 46. In one aspect, the ends 34 and 86 of the extrusion 50 can have longitudinal bores or channels 90 (FIG. 5) formed therein to receive fasteners 94 to secure the end plates 74 and 82 to the ends 34 and 86 of the extrusion 50. Similarly, the end plates 74 and 82 can have bores aligned with the bores or channels 90 of the extrusion 50 to receive the fasteners 94 therethrough.

In one aspect, the board 18 can have an aperture 98 in the board 18 extending from an exterior surface of the board 18 to the hollow 46 in order to drain water from hollow 46 and the board 18. A removable plug 102 can be received in the aperture 98 to allow water to drain from the hollow 46. For example, one of the end plates 82 can have a hole 98 to drain water from the hollow 46. A plug 102 can be removably received in the hole 98 to selectively plug the hole 98.

Figure 10:
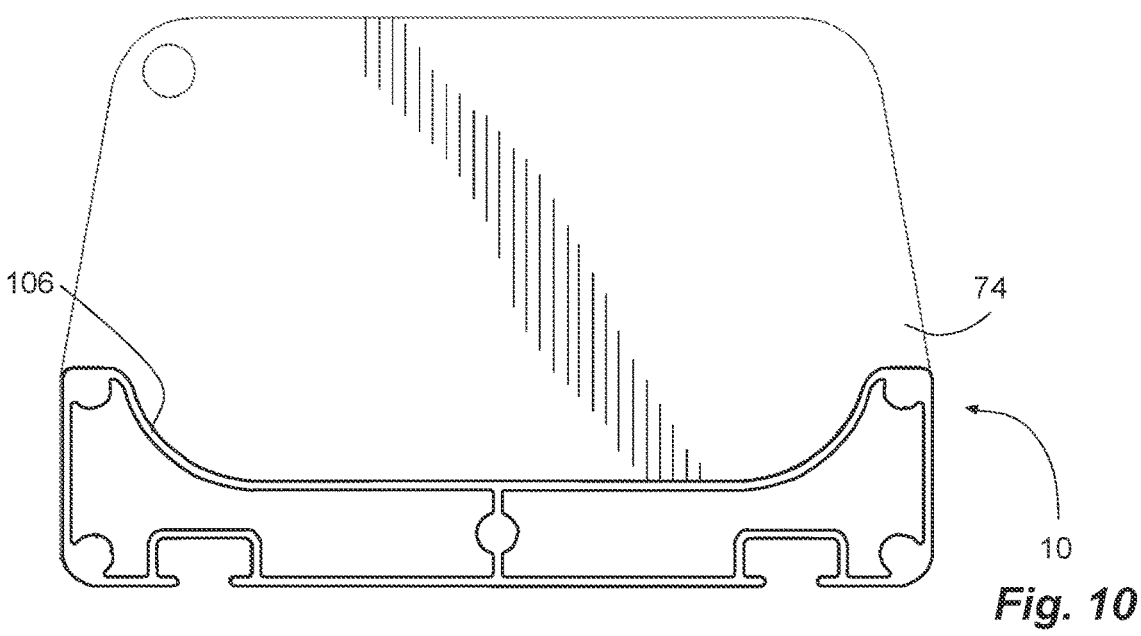
FIG. 10 is an end view of an end plate of the fish measuring board of FIG. 1 in accordance with an embodiment.
Figure 11:
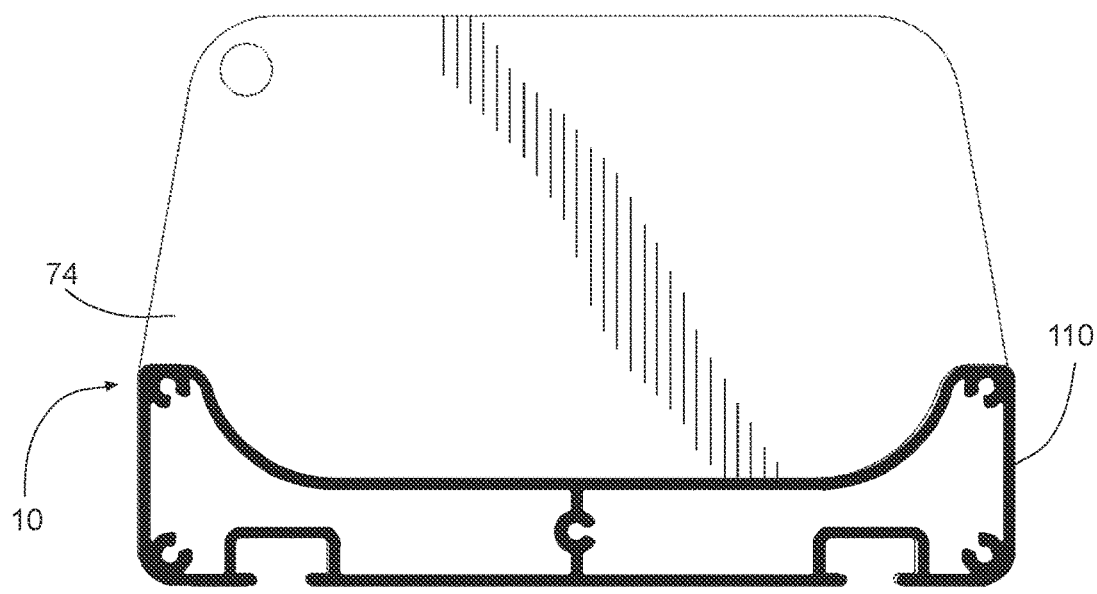
FIG. 11 is an end view of an end plate of the fish measuring board of FIG. 1 in accordance with an embodiment.
Figure 12:
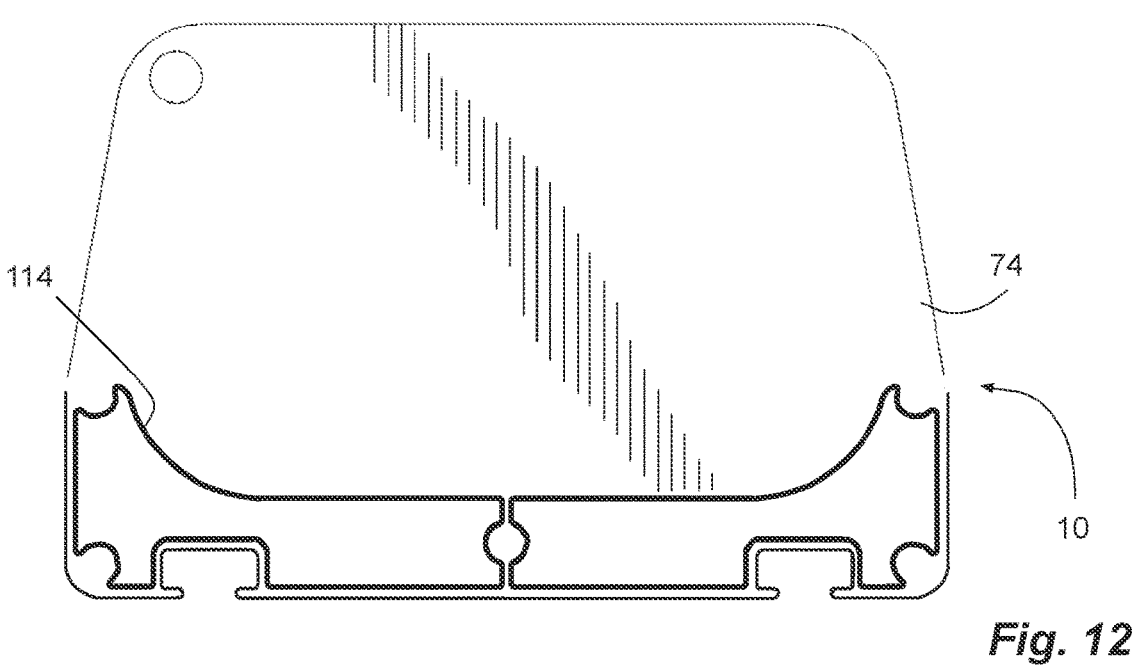
FIG. 12 is an end view of an end plate of the fish measuring board of FIG. 1 in accordance with an embodiment.
Figure 13:
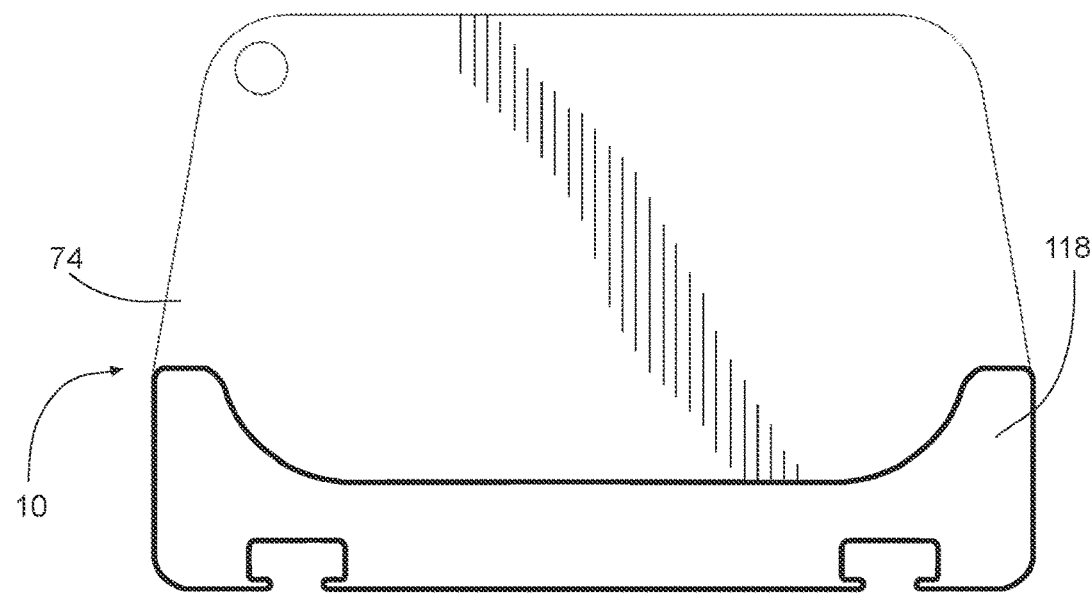
FIG. 13 is an end view of an end plate of the fish measuring board of FIG. 1 in accordance with an embodiment.
Figure 14:
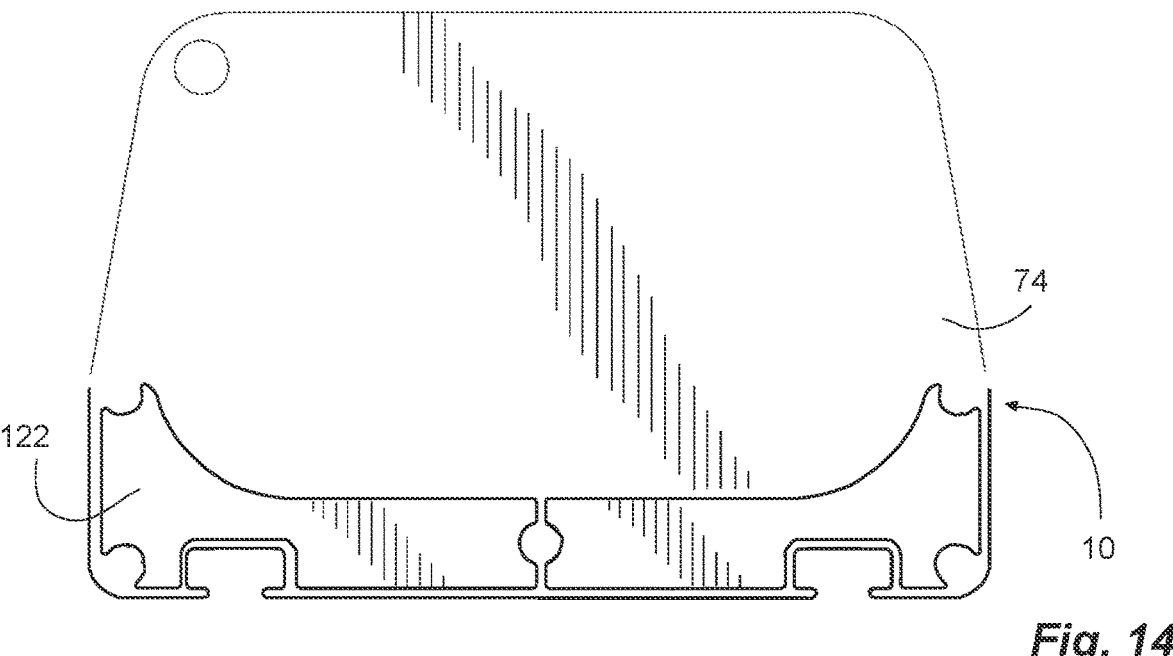
FIG. 14 is an end view of an end plate of the fish measuring board of FIG. 1 in accordance with an embodiment.

In another aspect, the proximal and/or distal end plates 74 and/or 82 can have an annular channel 106 to receive the end 34 and/or 86 of the extrusion as shown in FIG. 10. The annular channel 106 can match the profile of the extrusion 50. In another aspect, a seal or gasket 110 can be disposed between the end 34 and/or 86 of the extrusion 50 and the respective end plate 74 and/or 82, as shown in FIG. 11. In another aspect, the proximal and/or distal end plates 74 and/or 82 can each have an annular flange 114 that can extend into the extrusion 50 and form a press-fit, as shown in FIG. 12. In another aspect, the proximal and/or distal end plates 74 and/or 82 can each have a cavity 118 that matches the profile of the extrusion 50 to receive the extrusion 50, as shown in FIG. 13. In another aspect, the proximal and/or distal end plates 74 and/or 82 can each have a protrusion 122 that matches a profile of the interior hollow 46 and that can be inserted into the hollow 46 of the extrusion 50, as shown in FIG. 14. In another aspect, the end plates 74 and/or 82 can be adhered to the ends 34 and/or 86 of the extrusion 50.

In one aspect, the proximal and distal end plates 74 and 82 can be formed of plastic and can be formed by injection molding or additive manufacturing such as 3D printing.

In another aspect, the extrusion 50 can have a support wall 126 (FIG. 5) extending longitudinally along the extrusion 50 and extending between the top 58 and the bottom 62, and positioned intermediate the opposite sides 66 and of the extrusion 50. The support wall 50 can support and maintain the shape of the trough 26 and the stiffness of the board 18. The support wall 126 can also have a longitudinal channel or bore 90 to receive a fastener 94 to help seal the end plates 74 and 82 to the extrusion 50. In another aspect, the support wall 126 can bifurcate the hollow 46 into a pair of elongated, longitudinal hollows 130 and 134. Multiple hollows 130 and 134 can help maintain buoyancy if one hollow is compromised.

In another aspect, the board 18 and the extrusion 50 can have an elongated track 138 in a bottom 62 of the board 18 and the extrusion 50 to receive and couple an accessory. In one aspect, the track 138 can extend longitudinally. In another aspect, the track 138 can be an elongated T-channel formed in the bottom 62 of the board 18 and the extrusion 50. In another aspect, the board 18 can have a pair of tracks 138 and T-channels. The pair of tracks 138 and T-channels can be spaced-apart from one another and oriented parallel with respect to one another. Thus, the accessory can be coupled to either side of the board 18 and the extrusion 50. The track 138 and the T-channel can have a bottom 142, opposite sides 146 and an open top 150. A pair of opposing flanges 154 can extend from the opposite sides 146 at the open top 150 to form a reduced opening 158 to an enlarged cavity 160 between the sides 146.

In another aspect, the proximal and/or the distal end plate 74 and/or 82 can have a notch 164 corresponding to the track 138 and the T-channel. Thus, the track 138 and the T-channel can have an open end to receive a foot 168 (FIGS. 7-9) for attachment. The open end allows accessories to be positioned in the track 138 and the T-channel. In one aspect, both ends of the track 138 and the T-channel can be open to receive attachment from both ends. In another aspect, only one end of the track 138 and the T-channel can be open to receive attachment only from that end. In another aspect, both ends of the track 138 and the T-channel can be closed to resist the attachment or foot 168 from sliding out.

Figure 6:
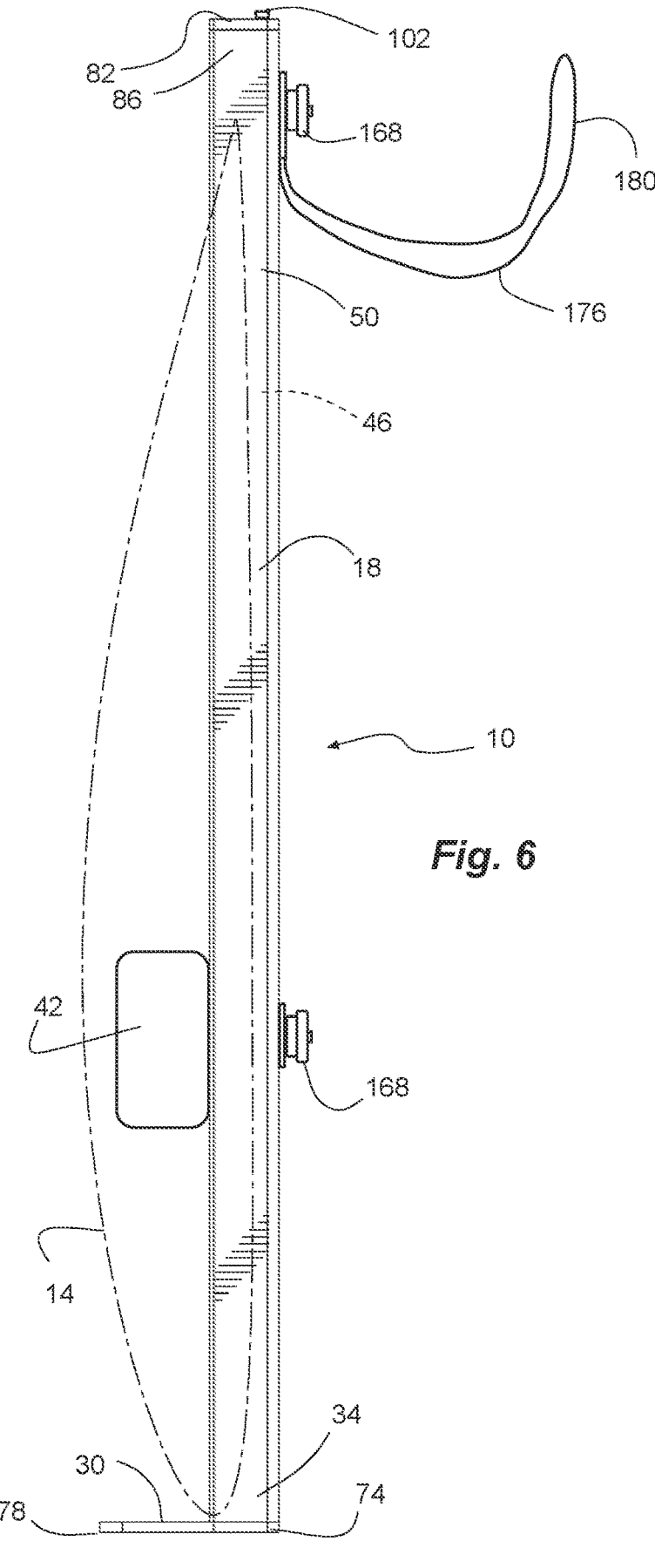
FIG. 6 is a side view of the fish measuring board of FIG. 1, shown with attached accessories, namely a lanyard and an identifier.
Figure 7:
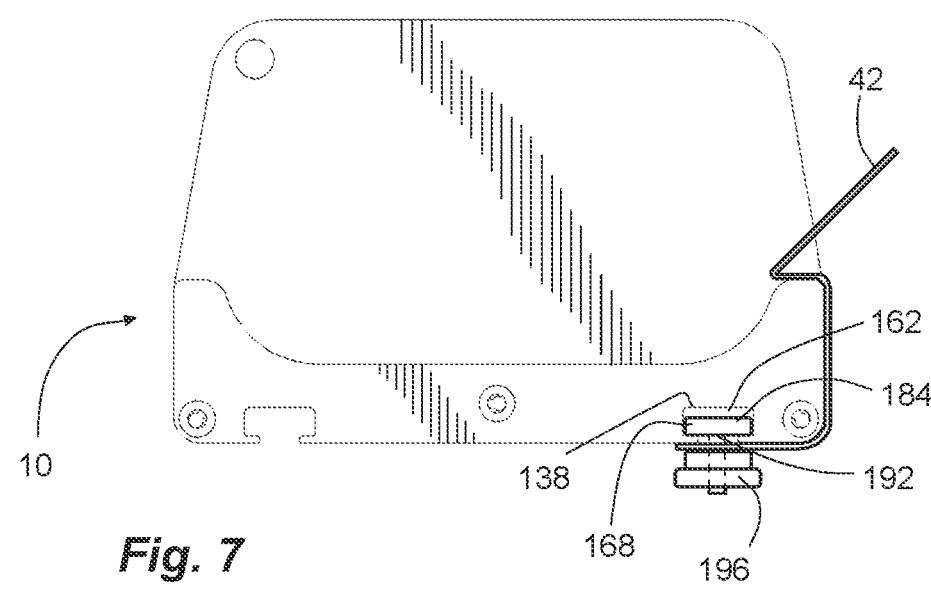
FIG. 7 is an end view of the fish measuring board of FIG. 1, shown with an attached accessory, namely an identifier.
Figure 8:
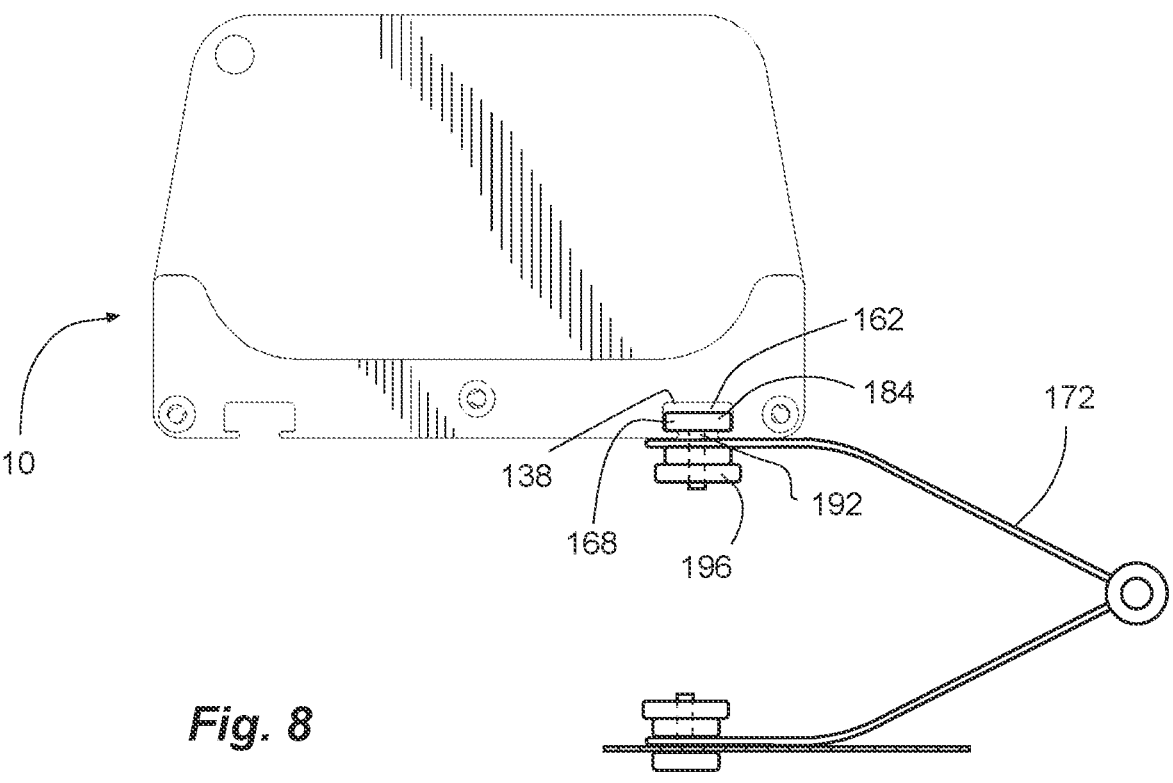
FIG. 8 is an end view of the fish measuring board of FIG. 1, shown with an attached accessory, namely an articulated arm.
Figure 9:
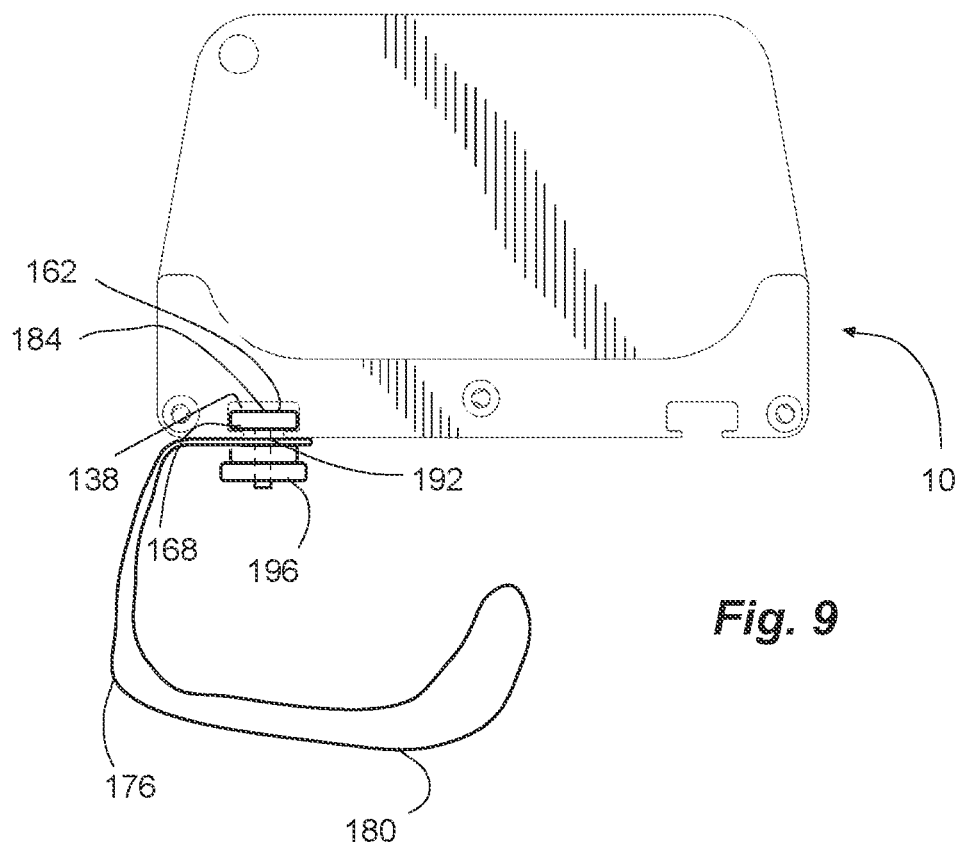
FIG. 9 is an end view of the fish measuring board of FIG. 1, shown with an attached accessory, namely a lanyard.

The accessory can be an identifier 42 with a foot 168 received in the track 138 and the T-channel, as shown in FIGS. 6 and 7. The accessory can be an articulated armature 172 with one end secured to a watercraft and the other end with a foot 168 received in the track 138 and the T-channel, as shown in FIG. 8. The accessory can be a lanyard 176 with a flexible loop or strap 180 coupled to a foot 168 received in the track 138 and the T-channel, as shown in FIG. 9. The accessory can have a foot 168 with a T-shaped nub 184 that can be inserted into the T-channel 138. The nub 184 can have a head 188 that travels in the track 138, a neck 192 extending from the head 188 out of the reduced opening 158 of the track 138, and a lock 196 that can travel on the neck 192 and bear against the bottom 62 of the board 18 and the flanges 154 to secure the nub 184 in place. The head 188 can have a cross-sectional shape substantially the same as a cross-sectional shape of the track 138 and T-channel. The neck 192 can have a width substantially the same as a gap between the flanges 154 of the reduced opening 158. The neck 192 and the lock 196 can be threaded and can threadably engage one another.

In another aspect, the foot 168 and the T-shaped nub 184 can have an oblong shape that allows the nub 184 to be inserted through the reduced opening 158 and into the enlarged cavity 162 of the track 138 and the T-channel. The nub 184 can be turned in the enlarged cavity 162 so that it abuts to the pair of opposing flanges 154.

In use, the fish measuring board 10 can be carried with the fisherman and/or tournament participant. In one aspect, the board 10 can be carried by a kayak. In another aspect, the board 10 can be secured to the kayak, such as on a line or on a flexible mount. In one aspect, the line or flexible mount can be secured to the board 10 using the track 138 or T-channel. In another aspect, the board 10 can be carried by the fisherman. In another aspect, the board 10 can be secured to the fisherman, such as by a lanyard 176 or line. In one aspect, the lanyard 176 or line can be secured to the board 18 with the track 138 or T-channel. In another aspect, an identification tag 42 can be secured to the board 18 using the track 138 or T-channel. If the board 10 is dropped, the buoyancy of the board 18 can resist the board from sinking. Thus, the board can be recovered.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under" and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

The terms "interference fit" and "friction fit" and "press-fit" are terms of art used interchangeably herein to refer to deliberately causing, increasing and/or using friction to deliberately resist movement. An interference fit or friction fit is different than and great than the existence of friction. While friction may exist between any two surfaces, is often desirable to do all one can to reduce this friction. An interference fit or friction fit can be distinguished from naturally occurring friction by being actually deliberately caused and increased. An interference fit can be created by dimensioning engaging parts so that their surfaces tightly bear against one another. A friction fit can be created by surface roughness that is rougher.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described, One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A fish measuring board, comprising:
an elongated extrusion forming an elongated board with a trough configured to receive a fish and an elongated hollow;
a proximal end plate closing an open proximal end of the elongated extrusion and having a tab extending beyond the extrusion to form a stopper configured to abut to the fish;
a distal end plate closing an open distal end of the elongated extrusion;
a scale carried by the board and extending from the stopper configured to measure a length of the fish; and
the hollow being substantially sealed and configured to provide buoyancy to the board.

2. The fish measuring board in accordance with claim 1, further comprising:
an elongated track in a bottom of the board configured to receive and couple an accessory; and
the elongated track having a pair of opposing flanges to form a reduced opening to an enlarged cavity.

3. The fish measuring board in accordance with claim 2, further comprising:
an elongated T-channel formed in the bottom of the board and defining the track.

4. The fish measuring board in accordance with claim 2, further comprising:
a pair of tracks spaced-apart from one another and oriented parallel with respect to one another.

5. The fish measuring board in accordance with claim 2, wherein the accessory comprises at least one of:
an identifier with a foot received in the track;
an articulated armature with one end secured to a watercraft and the other end coupled in the track; or
a lanyard coupled to the track.

6. The fish measuring board in accordance with claim 1, further comprising:

the elongated extrusion having a cross-sectional profile with a continuous perimeter completely circumscribing the hollow.

7. The fish measuring board in accordance with claim 1, further comprising:
an elongated T-channel formed in the bottom of the board;
at least one of the proximal and distal end plates having a notch corresponding to the T-channel and defining an open end of the T-channel.

8. The fish measuring board in accordance with claim 1, further comprising:
an aperture in the board extending from an exterior surface of the board to the hollow; and
a removable plug received in the aperture configured to allow water to drain from the hollow.

9. The fish measuring board in accordance with claim 1, further comprising:
the board having a cross-sectional profile with a concave top, a bottom, and opposite sides extending between the top and the bottom, with the top and the bottom spaced-apart from one another and the opposite sides spaced-apart from one another to define the hollow.

10. A fish measuring board, comprising:
an elongated board having an upper surface with a trough configured to receive a fish;
a stopper at one end of the board and closing the trough and configured to abut to the fish;
a scale carried by the board and extending from the stopper configured to measure a length of the fish; and
an elongated T-channel in a bottom of the board configured to receive and couple an accessory;
the elongated T-channel having a bottom, opposite sides, an open top, and a pair of opposing flanges extending from the opposite sides at the open top to form a reduced opening to an enlarged cavity between the opposite sides.

11. The fish measuring board in accordance with claim 10, further comprising:
a pair of T-channels spaced-apart from one another and oriented parallel with one another.

12. The fish measuring board in accordance with claim 10, wherein the accessory comprises at least one of:
an identifier with a foot received in the track;
an articulated armature with one end secured to a watercraft and the other end coupled in the track; or
a lanyard coupled to the track.

13. The fish measuring board in accordance with claim 10, further comprising:
a hollow in the board being substantially sealed and configured to provide buoyancy to the board.

14. The fish measuring board in accordance with claim 13, further comprising:
an elongated extrusion forming the board, the trough, and the hollow;
a proximal end plate closing a proximal end of the extrusion and having a tab extending beyond the extrusion to form the stopper; and
a distal end plate closing a distal end of the extrusion;
the hollow in the board being substantially sealed by the proximal and distal end plates.

15. The fish measuring board in accordance with claim 14, further comprising:
the elongated extrusion having a cross-sectional profile with a continuous perimeter completely circumscribing the hollow.

16. The fish measuring board in accordance with claim 14, further comprising:

an elongated T-channel formed in the bottom of the board and defining the track; and at least one of the proximal and distal end plates having a notch corresponding to the T-channel and defining an open end of the T-channel.

17. The fish measuring board in accordance with claim 13, further comprising:

the board having a cross-sectional profile with a concave top, a bottom, and opposite sides extending between the top and the bottom, with the top and the bottom spaced-apart from one another and the opposite sides spaced-apart from one another to define the hollow.

18. A fish measuring board, comprising:

an elongated board having an upper surface with a trough configured to receive a fish;

an elongated extrusion forming the board and having a cross-sectional profile with a concave top, a bottom spaced-apart from the top, opposite sides extending between the top and the bottom, and an elongated hollow;

the elongated extrusion having a cross-sectional profile with a continuous perimeter completely circumscribing the hollow;

a stopper at a proximal end of the extrusion and closing the trough and configured to abut to the fish when in the trough;

a scale carried by the board and extending from the stopper configured to measure a length of the fish;

a proximal end plate closing the proximal end of the extrusion and having a tab extending beyond the extrusion to form the stopper;

a distal end plate closing a distal end of the extrusion;

the hollow in the board being substantially sealed by the proximal and distal end plates and configured to provide buoyancy to the board;

an elongated T-channel formed in the bottom of the extrusion configured to receive and couple an accessory; and at least one of the proximal and distal end plates having a notch corresponding to the T-channel and defining an open end of the T-channel.

*   *   *   *   *